Figure 1:
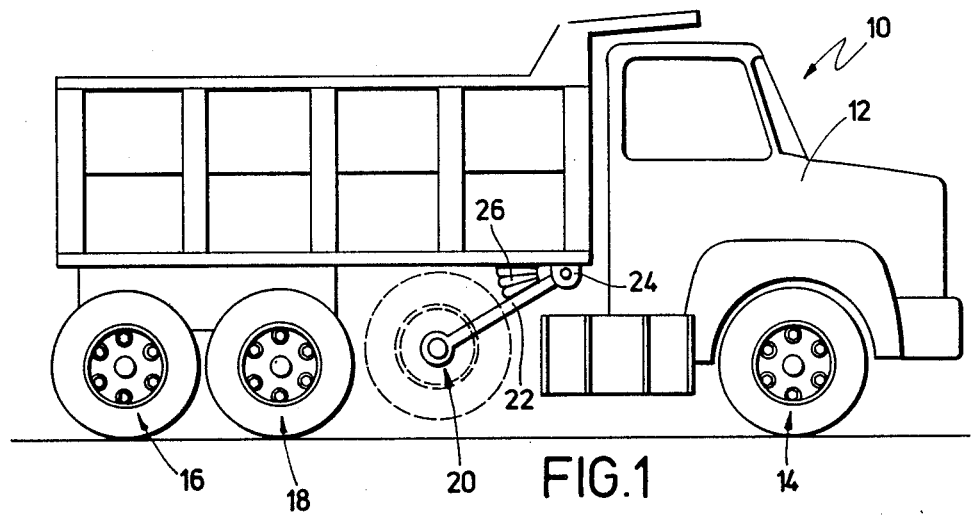

United States Patent [19]
Eberling

[11] Patent Number: 4,944,526
[45] Date of Patent: Jul. 31, 1990

[54] AIR SUSPENSION SYSTEM WITH LOAD CONTROLLED LIFTABLE AXLE

[75] Inventor: Charles E. Eberling, Wellington, Ohio

[73] Assignee: Allied-Signal Inc., Morristown, N.J.

[21] Appl. No.: 345,818

[22] Filed: May 1, 1989

[51] Int. Cl.$^5$ .............................................. B60G 11/26
[52] U.S. Cl. .................................. 280/704; 180/24.02; 280/714
[58] Field of Search ............................. 180/24.02, 290; 280/704, 714, 676

[56] References Cited

U.S. PATENT DOCUMENTS

| | | | |
|---|---|---|---|
| 4,284,156 | 8/1981 | Carstensen et al. | 180/24.02 |
| 4,553,773 | 11/1985 | Pierce | 180/24.02 |
| 4,700,968 | 10/1987 | Cherry | 180/24.02 |
| 4,789,038 | 12/1988 | Nguyen et al. | 180/24.02 |

Primary Examiner—Charles A. Marmor
Assistant Examiner—Karin Tyson
Attorney, Agent, or Firm—Ken C. Decker; William N. Antonis

[57] ABSTRACT

A suspension control system for controlling a liftable axle of a vehicle between a retracted, non-load bearing position and an extended, load bearing position includes a valve mechanism which responds to the pressure level in the air bags of the air suspension system of the non-liftable rear axle of the vehicle. The system includes a leveling valve which increases pressure in the air bags to maintain a constant vehicle height. Accordingly, the pressure level in the air bags in directly proportional to vehicle loading. The valve means responds to this pressure level to communicate pressure to the actuator means controlling the liftable axle when the pressure level in the air bags on the non-liftable rear axle attains a predetermined level. The liftable axle responds to this increase in pressure to extend into load bearing engagement with the road.

7 Claims, 1 Drawing Sheet

U.S. Patent      Jul. 31, 1990      4,944,526

AIR SUSPENSION SYSTEM WITH LOAD CONTROLLED LIFTABLE AXLE

This invention relates to a control system for controlling a liftable axle of a heavy duty vehicle.

Many heavy duty vehicles are equipped with liftable axles which are retracted when the vehicle is lightly loaded but which are extended to assist in supporting the vehicle when the vehicle is more heavily loaded. Accordingly, vehicles equipped with liftable axles can meet axle loading limitations imposed by law while minimizing tire wear and enhancing vehicle stability and drivability when the vehicle is lightly loaded.

Existing liftable axle systems require manual control by the vehicle operator. That is, the vehicle operator must decide when the vehicle is sufficiently loaded to require the additional axle. If the driver forgets to extend the liftable axle or misjudges the need for an additional axle to support a loaded vehicle, substantial fines for overloaded axles may be imposed, and the vehicle may be unsafe. Accordingly, it is desirable to effect automatic extension and retraction of the liftable axle. One prior art method of automatically effecting extension and retraction of a liftable axle is disclosed in U.S. Pat. No. 4,700,968. This patent discloses a complicated electropneumatic control which measures the weight carried by the load carrying bed of the vehicle. The present invention effects automatic control by responding to the Pressure level in the vehicle air suspension system. Accordingly, operation of the liftable axle is effected in response to the weight carried by the rear axles. Since the present invention uses standard air control valves and does not require complicated electronic sensors and controls, substantial costs savings result.

Figure 2:
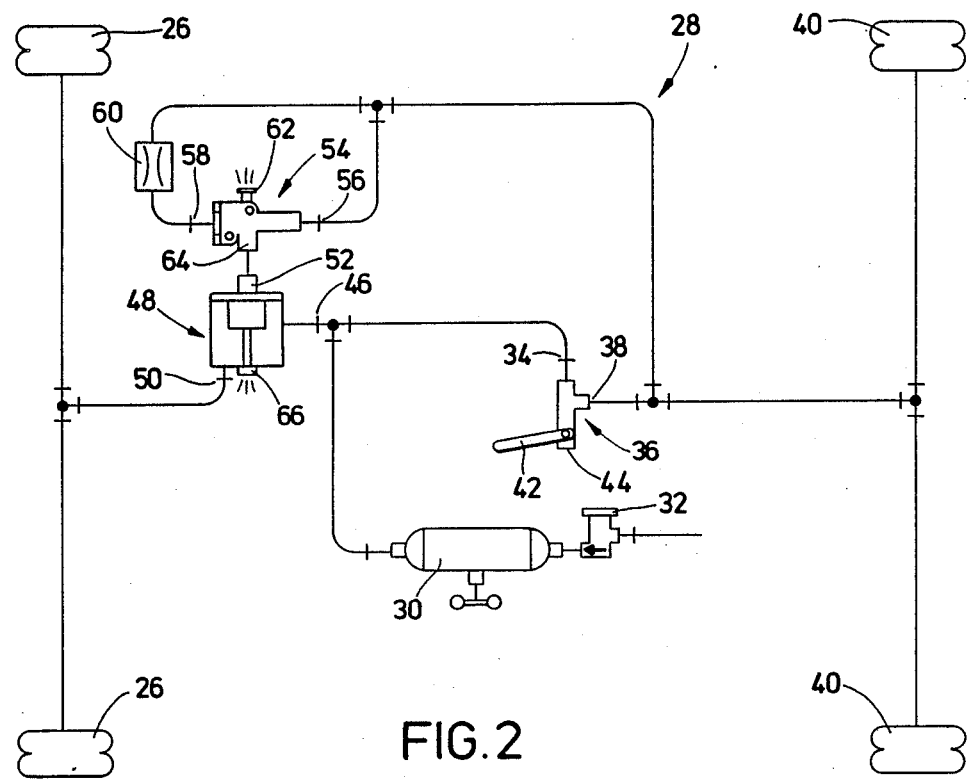

These and other advantages of the present invention will become apparent from the following description, with reference to the accompanying drawings, in which;

FIG. 1 is a diagrammatic representation of a heavy vehicle incorporating a liftable axle, with one wheel on the liftable axle removed so that the actuating components may be shown; and FIG. 2 is a schematic illustration of the control system pursuant to the present invention.

Referring now to the drawings, heavy vehicle 10 includes a body 12 supported by front axle 14 and one or more rear axles 16. A liftable axle generally indicated by the numeral 20 is also mounted on the body 12, and may be lowered to assist in supporting the vehicle when the vehicle is heavily loaded, and may be retracted when the vehicle is lightly loaded. Liftable axle 20 is mounted on a pivoting member 22 which is pivotally attached to a bracket 24 which is mounted on the vehicle body. A conventional actuator 26 is provided between the body 12 and the member 22. Actuator 26, as is well known to those skilled in the art, includes heavy duty springs which yieldably urge the axle 20 into the retracted position illustrated in FIG. 1. Actuator 26 further includes compressed air actuator which is pressurized with compressed air in order to effect extension of the liftable axle into load bearing engagement with the road. When the liftable axle 20 is in the down position the compressed air actuators act as air bags which support the vehicle body 12 on the liftable axle 20. Since the actuator 26 is conventional and is available from several sources, it will not be described in detail. The axles 14, 16 are supported by air bags (not shown), which are inflated with compressed air from the vehicle's compressed air braking system to maintain a predetermined vehicle height regardless of vehicle load. Accordingly, the Pressure in these air bags will be directly proportional to the load carried by the vehicle's rear axle 16.

Referring now to FIG. 2, the control system generally indicated by the numeral 28 includes a compressed air reservoir 30 which is charged by the vehicle air compressor (not shown), which is operated by the vehicle engine. The reservoir 30 is charged through a pressure protection valve 32, which opens to permit communication into reservoir 30 only when the pressure upstream of the valve 32 is above a predetermined pressure level. Pressure protection valve 32 also acts as a check valve, to prevent pressure from escaping from the reservoir 30 in case of a leak or pressure drop upstream of the valve 32. The reservoir 30 communicates with an inlet or supply port 34 of a conventional leveling valve generally indicated by the numeral 36. The outlet or delivery port 38 of the leveling valve 36 is communicated to the aforementioned air bags which support the vehicle body 12 on the rear axle 16. These air bags are illustrated schematically at 40 in FIG. 2. A second leveling valve (not shown) controls a set of air bags (not shown) supporting the vehicle body on the front axle 14. The valve 36 is conventional, and includes a lever arm 42, which is connected to the vehicle axle 16. The valve 36 is mounted on the vehicle body so that arm 42 is moved in response to deflection between the body 12 and the axle 16 in response to increasing or decreasing vehicle load. The valve 36 responds to movement of the arm 42 to open communication between the supply and delivery ports to increase the pressure level in the air bags 40 as the vehicle load is increased, to thereby maintain a predetermined distance between the body 12 and the axle 14. If the load on the vehicle 10 is decreased, the arm 42 causes the valve 36 to vent the delivery port 38 to atmosphere through exhaust port 44 to decrease the pressure level in the air bags 40 to thereby again maintain the predetermined distance between the body and the rear axle 14. Accordingly, the pressure level in the air bags 40 is directly proportional to the load carried by the vehicle 10.

The reservoir 30 is also connected to a supply port 46 of a conventional air brake relay valve 48. The delivery port 50 of relay valve 48 is communicated to the actuators 26, which control extension and retraction of the liftable axle 20. As discussed above, the actuator 26 incorporates a high powered spring (not shown) which yieldably urge the liftable axle 20 toward its retracted position. However, when the pressure level of the compressed air communicated into the actuator 26 is sufficient to overcome the aforementioned springs, the liftable axle 20 is urged into load supporting engagement with the road. Communication of compressed air in the reservoir 30 to the actuator 26 is controlled by the relay valve 48. Relay valve 48 includes a control port 52. When a pressure signal is communicated to control port 52, the relay valve 48 responds by initiating communication between the supply port and the delivery port 50, thereby charging the actuator 26 with compressed air. Relay valve 48 is a conventional air brake relay valve and is well known to those skilled in the art. Accordingly, it will not be described in detail herein.

Communication of the control signal to the control port 52 is effected by a conventional air control valve generally indicated by the numeral 54. Control valve 54 includes a supply port 56 which is communicated with the delivery port 38 of the leveling valve 36. Valve 54 further includes a control port 58, which is also communicated with the delivery port 38 of the leveling valve 36. An orfice 60 may be located just upstream of the control port 58, to dampen pressure variations communicated to the the control port 58. Control valve 54 further includes an exhaust port 62 and a delivery port 64, which is communicated to the control port 52 of the relay valve 48. The control valve 54 vents the delivery port 64 to the exhaust port 62 when the pressure at control port 58 is below a predetermined level. However, when pressure at control port 58 attains a predetermined level, valve 54 closes off communication between delivery port 64 and exhaust port 62, and initiates communication between supply port 56 and delivery port 64, thereby providing a pressure signal to control port 52 of relay valve 48. Due to normal valve hysteresis, the supply port 56 remains communicated to delivery port 64 until the pressure level at control port 58 drops to a predecided pressure level which is considerably less than the pressure level required to initiate communication between the supply port 56 and delivery port 64. When pressure drops to this predecided pressure level, however, communication between supply and delivery ports 56, 64 is terminated, and delivery port 64 is vented to exhaust port 62, thereby also removing the pressure signal communicated to control port 52 of relay valve 48. The construction and operation of the control valve 54 is conventional, and is well known to those skilled in the art. Accordingly, the valve 54 will not be disclosed in detail herein.

In operation, due to the action of the leveling valve 36, the pressure level in the air bags 40, and the pressure level at delivery port 38 of leveling valve 36, is directly proportional to the load carried by the vehicle rear axle 16. Accordingly, since control port 58 is communicated to delivery port 38, the pressure level communicated to control port 58 of the control valve 54 is also a function of load carried. When this pressure level attains a predetermined value, valve 54 responds by communicating supply port 56, which is also communicated to the outlet of delivery port 38, to the delivery port 64. AccordinglˢY, a pressure signal is communicated to control port 52 of relay valve 48, which initiates communication between the supply port 46 and delivery port 50. When the vehicle load attains a predetermined value represented by the predetermined pressure level at control port 58, relay valve 48 communicates a corresponding pressure level from the reservoir 30 to the actuator 26, thereby extending the liftable axle 20 into load bearing engagement with the road. Similarly, when the load on the vehicle is reduced and the leveling valve 36 accordingly reduces the pressure level in air bags 40, the pressure level at control port 58 of control valve 54 is correspondingly reduced. As discussed above, due to normal valve hysteresis, the pressure at control port 58 must drop a predecided pressure level which is considerably lower than the aforementioned predetermined pressure level which initiated communication between the supply and delivery ports 56, 64 of control valve 54. However, when pressure level at the control port 58 does drop to the predecided pressure level, the pressure signal to control port 52 of relay valve 48 is vented, thereby causing relay valve 48 to terminate communication between supply port 46 and delivery port 50, while simultaneously venting delivery port 50 to atmosphere through exhaust port 66 of relay valve 48. When this occurs, the pressure level in actuator means 26 is vented, permitting the aforementioned heavy duty springs to retract the liftable axle into the retracted, non-load bearing position.

I claim:

1. Suspension control system for a vehicle having a suspension system including support means using fluid pressure to support said vehicle and a liftable axle carrying wheels, said liftable axle being movable between a ground engaging position in which said wheels carried by the liftable axle engage the ground to assist in supporting the vehicle and a retracted position in which the wheels carried by the liftable axle are retracted from the ground, said suspension control system including valve means responsive to the pressure level in said suspension system to cause said liftable axle to move to the ground engaging position when the pressure level in the suspension system exceeds a predetermined level and to cause said liftable axle to move to the retracted position when the pressure level in the suspension system drops below a predecided level, said liftable axle including fluid pressure responsive means for causing said liftable axle to move between said positions, said valve means including communication controlling means for controlling communication between a source of fluid pressure and the fluid pressure responsive means, said valve means including pressure responsive means responsive to the pressure level in said support means, said pressure responsive means controlling said communication controlling means to communicate said fluid pressure responsive means to said fluid pressure source when the pressure level in the support means attains said predetermined level and to terminate communication between said fluid pressure responsive means and said fluid pressure source when the pressure level in the support means drops to said predecided pressure level.

2. Suspension control system as claimed in claim 1, wherein said communication controlling means communicates said fluid pressure responsive means to the fluid pressure source when the liftable axle is in the ground engaging position.

3. Suspension control system as claimed in claim 2, wherein said communication controlling means vents said fluid pressure responsive means when the liftable axle is in the retracted position.

4. Suspension control system as claimed in claim 3, wherein said liftable axle includes means yieldably urging said liftable axle to the retracted position, said fluid pressure responsive means opposing said yieldably urging means when the fluid pressure responsive means is communicated to said fluid pressure source.

5. Suspension control system as claimed in claim 1, wherein said communication controlling means is a control valve responsive to a pressure signal generated by said pressure responsive means to initiate communication between said fluid pressure source and said fluid pressure responsive means when said pressure signal is generated and to terminate communication between the fluid pressure source and the fluid pressure responsive means when the pressure signal is terminated.

6. Suspension control system as claimed in claim 5, wherein said valve means includes another control valve for communicating said pressure signal to said first-mentioned control valve, said another control valve being responsive to the pressure level in the support means to generate said control signal.

7. Suspension control system as claimed in claim 6, wherein said first-mentioned control valve includes a supply port communicated with the source of compressed air, a delivery port communicated with the fluid pressure responsive means, and a control port communicated with said another valve means for receiving said control signal, said first mentioned control valve being responsive to said control signal to communicate the supply and deliver ports and to termination of the control signal to terminate communication between the supply and delivery ports while simultaneously venting the delivery port.

* * * * *